Figure 1:
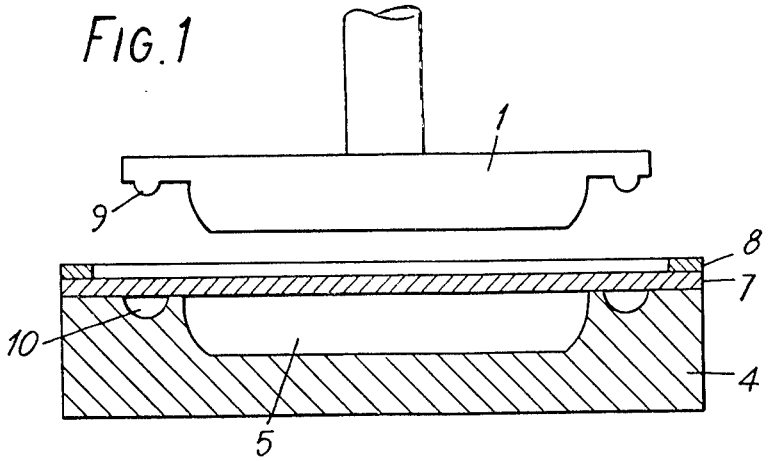
Figure 2:
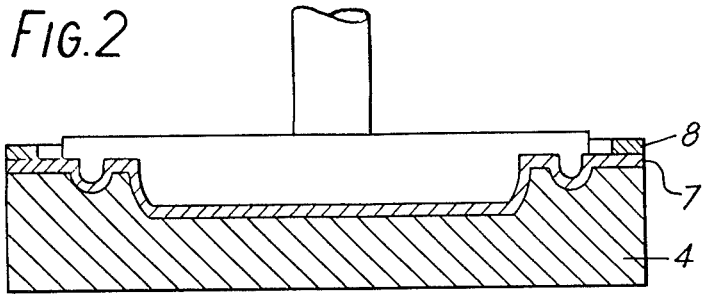
Figure 3:
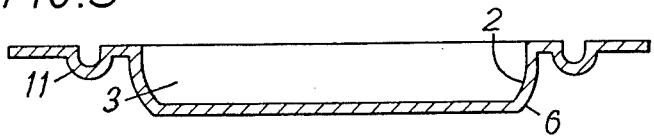
Figure 4:
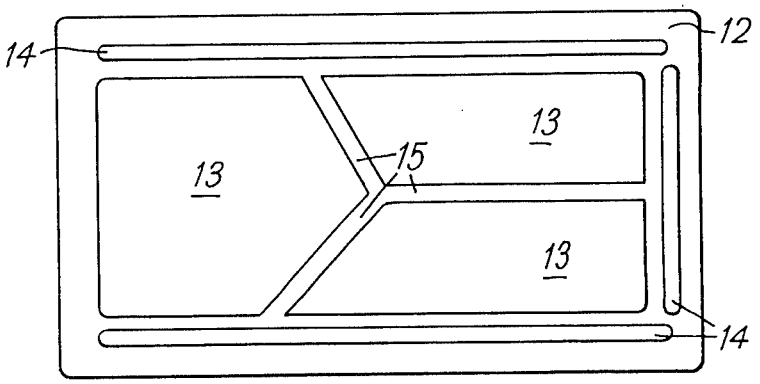
Figure 5:
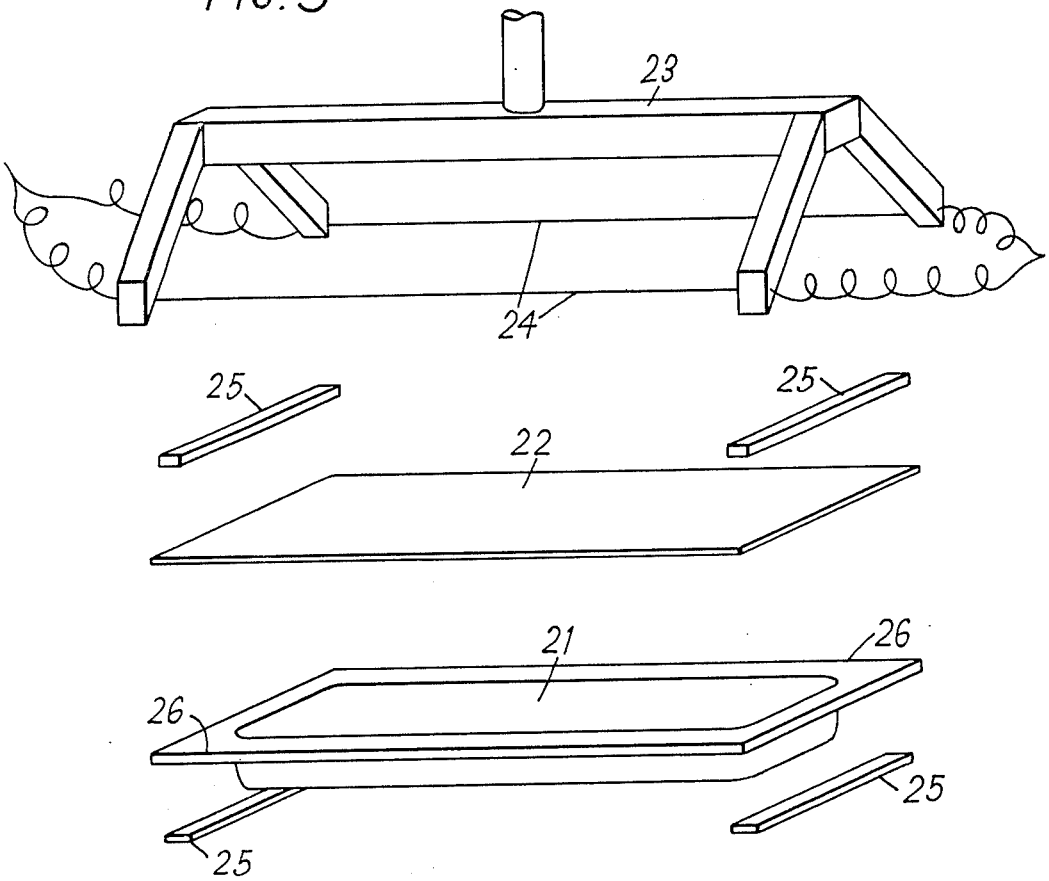
Figure 6:
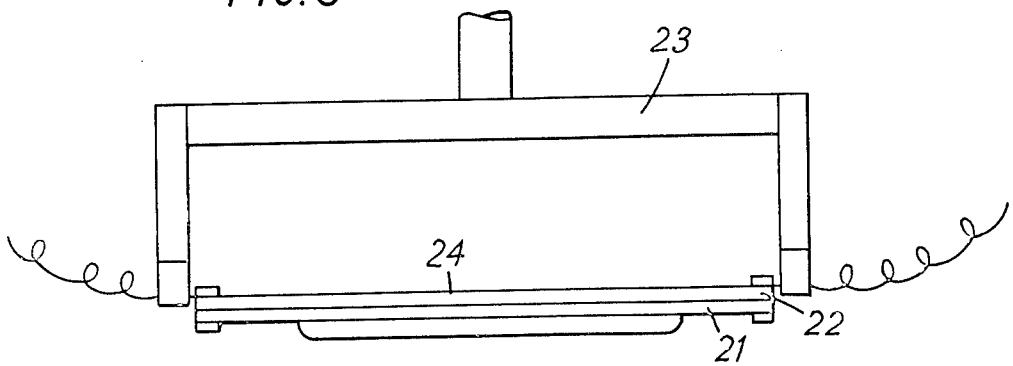
Figure 7:
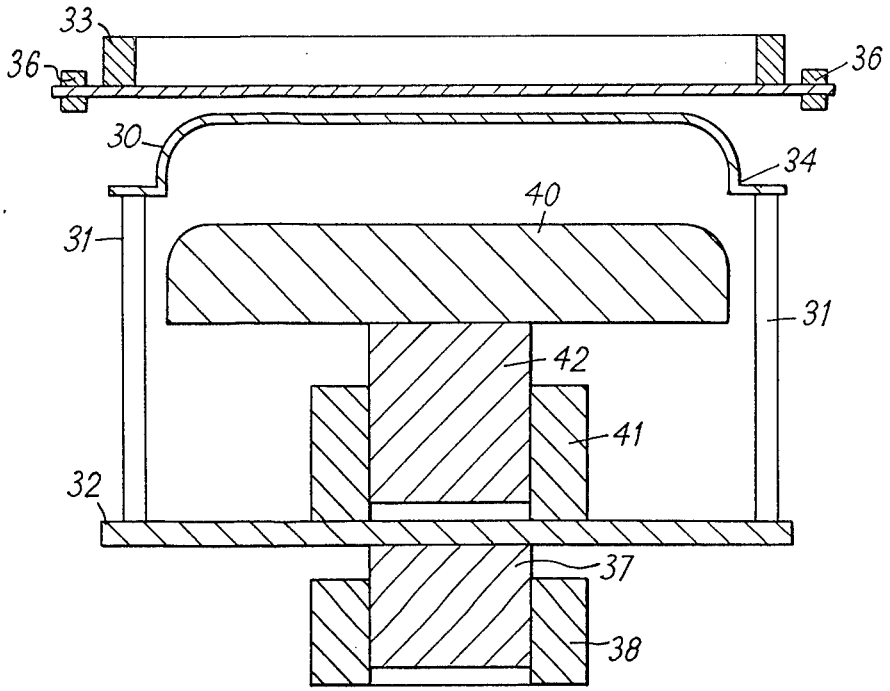
Figure 8:
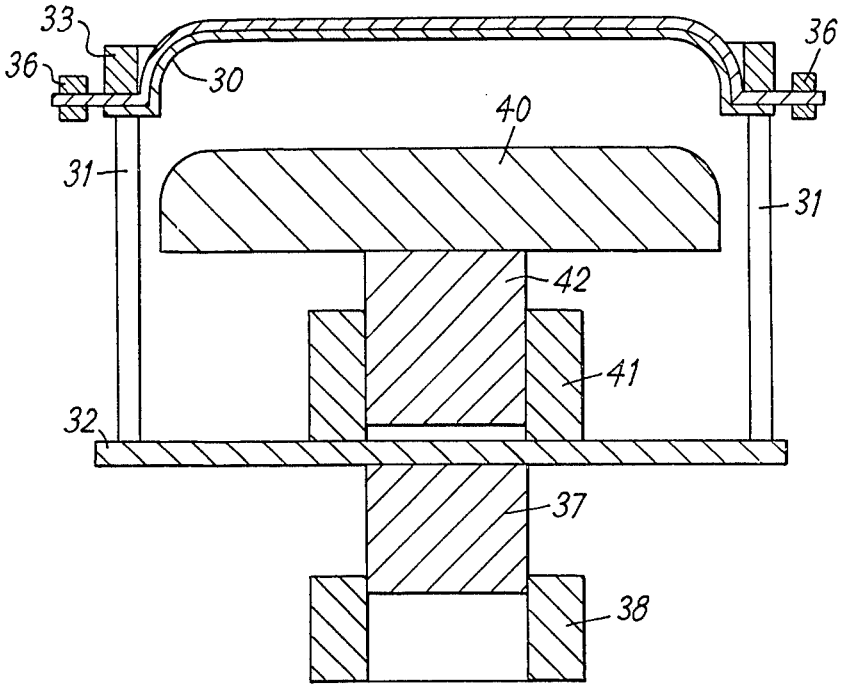
Figure 9:
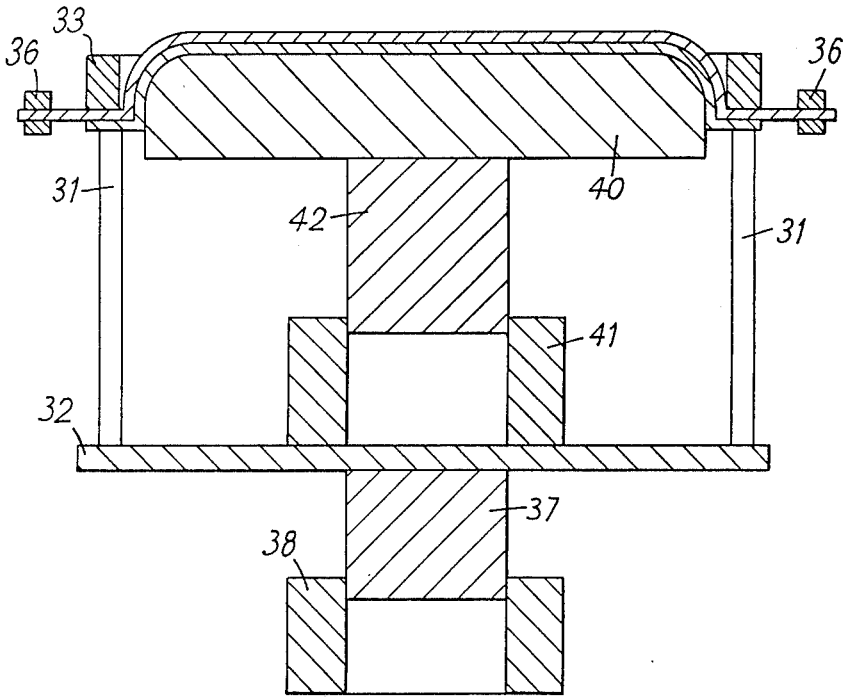
Figure 10:
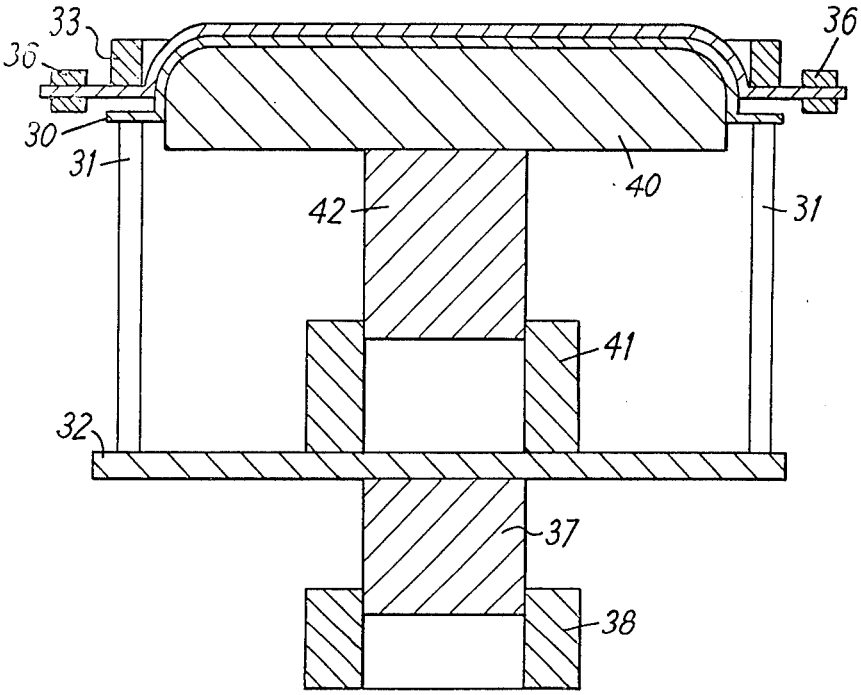
Figure 11:
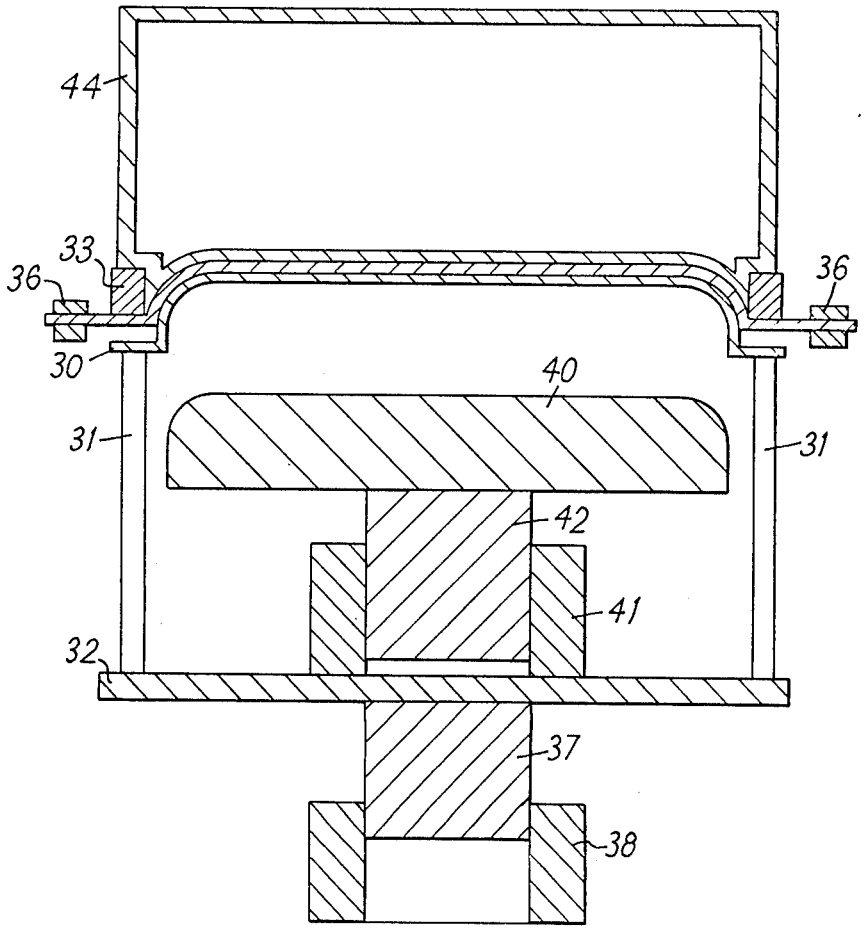

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 9

T941,018
PROCESS FOR THE PRODUCTION OF SHAPED ARTICLES

Kenneth Clarke, Knebworth, England, assignor to Imperial Chemical Industries Limited, London, England

Filed Sept. 16, 1974, Ser. No. 506,543
Claims priority, application Great Britain, Sept. 20, 1973, 44,132/73; Nov. 23, 1973, 54,386/73
Int. Cl. B29c *27/06*
U.S. Cl. 156—69
5 Sheets Drawing. 22 Pages Specification

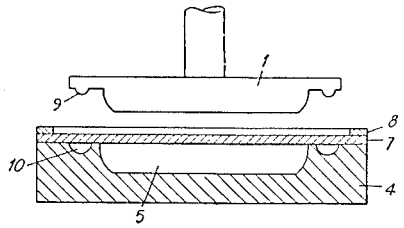

Shaped articles, such as food trays and the like, are produced by cold-forming polyester, especially oriented polyethylene terephthalate, films below the polyester glass transition temperature, heat setting and quenching. Slight relaxation at the heat setting temperature may be effected to improve dimensional stability. Short cycling times can be achieved by using a cold-forming punch of low thermal capacity, for instance a shaped copper sheet, through which the shaped film is heated while held in the deformed condition. Lids may be applied to the shaped articles by melt adhesives. Food containers so formed are suitable for heating in both conventional and microwave ovens.